United States Patent Office 3,766,088
Patented Oct. 16, 1973

3,766,088
PROCESS FOR THE REGENERATION OF CATALYST FOR HYDRATION OF NITRILE COMPOUNDS
Kiyotaka Yoshimura, Fujisawa, Shiro Asano and Tadatoshi Honda, Yokohama, and Ryoji Tsuchiya, Kamakura, Japan, assignors to Mitsui Toatsu Chemicals, Incorporated, Tokyo, Japan
No Drawing. Filed Dec. 14, 1971, Ser. No. 207,998
Claims priority, application Japan, Dec. 24, 1970, 45/116,694
Int. Cl. B01j *11/30, 11/02*
U.S. Cl. 252—412
5 Claims

ABSTRACT OF THE DISCLOSURE

A process for regenerating a metallic copper catalyst used in producing corresponding amide compounds from nitrile compounds by hydrating their nitrile radical, comprising treating the catalyst with an aqueous solution of a compound selected from the group consisting of sodium compounds, potassium compounds, calcium compounds and ammonium compounds.

BACKGROUND OF THE INVENTION

It is known that acrylamide and methacrylamide can be produced from acrylonitrile or methacrylonitrile, respectively, in the presence of copper catalysts. However, production of these amide compounds on an industrial scale, e.g., production of acrylamide by hydration of acrylonitrile on an industrial scale, has not yet been fully developed, nor has the process for the regeneration of catalysts which have lost their activity.

The catalyst usable in the process of the present invention are metallic copper catalysts such as Raney copper, Ullmann copper and reduced copper, reduction-type catalysts of copper based multi-component alloys such as copper-chromium and copper-zinc, and metallic copper pieces in the form of powder, wire or net, etc., and these are generically called metallic copper catalysts. The reaction is carried out in a liquid phase or a vapour phase by heating a mixture of a nitrile compound and water at a temperature of about 50–200° C. for several hours.

In the above catalytic reaction, it is generally desirable that the activity of the catalyst be maintained stable for a long period of time, e.g., for several months, but in practical operation it is almost unavoidable that the catalyst loses its activity gradually or otherwise rapidly.

SUMMARY OF THE INVENTION

The object of the present invention is to regenerate deactivated metallic copper catalysts efficiently, and reduce the production cost of amide compounds by repeated use of the regenerated catalysts.

According to the present invention, metallic copper catalysts used in producing corresponding amide compounds from nitrile compounds by hydrating their nitrile radical, can be regenerated efficiently when deactivated, by treating the deactivated catalyst with an aqueous solution of a sodium, potassium, calcium or ammonium compound.

DETAILED DESCRIPTION OF THE INVENTION

As regards the deactivation of metallic copper catalyst used in producing the corresponding amide compounds from nitrile compounds by hydrating their nitrile radical, the following causes (A)–(D) have been ascertained by the present inventors.

(A) The catalyst is partially oxidized by oxygen gas which has entered the reaction system as an impurity in the raw materials or in other ways, and as a result, conversion of the nitrile compound to the corresponding amide is lowered. In the case when the nitrile compound is acrylonitrile, this not only impedes formation of the objective acrylamide in accordance with the following reaction Formula 1, but also forms ethylene cyanhydrin and β-hydroxypyropionamide in accordance with the reaction Formulas 2 and 3, respectively, and this is a serious defect with regard to an industrial catalyst.

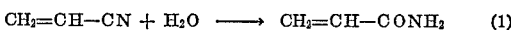
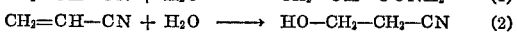
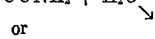

$CH_2=CH-CN + H_2O \longrightarrow CH_2=CH-CONH_2$ (1)
$CH_2=CH-CN + H_2O \longrightarrow HO-CH_2-CH_2-CN$ (2)
$CH_2=CH-CONH_2 + H_2O$
or
$HO-CH_2-CH_2-CN + H_2O$
$\longrightarrow HO-CH_2-CH_2-CONH_2$ (3)

In the case when the nitrile compound is methacrylonitrile, similar side-reactions are caused in accordance with similar reaction formulas. To prevent these side-reactions, methods of removing oxygen from the raw materials beforehand, methods of keeping the reaction system air-tight and thus avoiding contact of the catalyst with air, etc. have been adopted. Nevertheless, it is difficult to remove oxygen from the raw materials completely, and its effect gradually appears in a long-term operation.

(B) Even if the catalyst and pure water are sealed in a stainless steel (SUS–27) container and presence of oxygen is cut off, the catalyst activity is lowered if only the contents are heated to temperatures at which the reactions are usually carried out, e.g., at 120° C. Namely, even if the known causes, such as the dissolved oxygen referred to the preceding paragraph, the polymerization reaction and the catalytic poison referred to in the following paragraphs, are all removed, the catalyst activity is lowered.

(C) In the case of a hydration reaction of a polymerizable nitrile compound, such as acrylonitrile or methacrylonitrile, polymerization of the nitrile compound or the objective amide compound takes place on the surface of the catalyst and the catalyst activity is remarkably lowered if the reaction conditions are not properly chosen.

(D) Impurities contained in the raw materials, especially water, act as catalyst poisoning agents. Accordingly, it is preferable to use purified water, such as demineralized water or distilled water.

The process of the present invention for the regeneration of catalysts is particularly effective against causes (A) and (B) above-described for the deactivation of metallic copper catalysts used in hydrating the nitrile radical of nitrile compounds.

To describe in further detail the regeneration effect by the process of the present invention, the catalytic activity for converting nitrile compounds into corresponding amide compounds is recovered, and at the same time the formation of by-products can be restrained, by treating the deactivated metallic copper catalyst with a regenerating agent, and further the process in itself has the following advantages.

Firstly, the agents used for regeneration, except compounds which form cyanide ions when dissolved in water, are of low cost and have low toxicity and little danger of explosion; secondly, the operation for regeneration is simple, does not require any special device and can be carried out in the conventionally used reaction vessels; and thirdly, the operation for regeneration is completed in a comparatively short period of time.

As the reactivating agents used in the process of the present invention, salts which contain hydroxides and accelerate the disolution of copper are generally effective and, for example, compounds which are strongly alkaline when dissolved in water, such as NaOH, KOH, $Ca(OH)_2$, $Na_2CO_3$ and $K_2CO_3$; compounds which give ammonium ions when dissolved in water, such as $NH_4Cl$, $(NH_4)_2SO_4$ and $NH_3$; compounds which give chlorine ions when dissolved in water, such as NaCl, KCl and CaCl₂; and compounds which give cyanide ions when dissolved in water, such as NaCN and KCN, are employed, and a mixture of not less than two of said compounds may also be used. As the solvent for said reactivating agents, water or an organic solvent which dissolves water therein is used.

Usually, the operation for regeneration of deactivated metallic copper catalyst is easily carried out by removing the deactivated catalyst from the reaction vessel and steeping it in said reactivating agent solution, but it is also easily practicable to circulate said reactivatng agent soluton through the reaction vessel to effect reactivation.

The steeping temperature adopted at the time of said steeping treatment of the deactivated catalyst may be maintained at a temperature of 0–200° C., is usually within the range of 20–200° C., but it is preferable to conduct said steeping treatment at a temperature within the range of 20–150° C.

The concentration of the reactivating agent adopted at the time of the steeping treatment is not particularly limited, but is sufficient if only it is below that of the saturated solution of said agent at the regeneration temperature. Usually, a concentration of 1–40% by weight is employed.

The following examples are given by way of the illustration of the present invention. In the examples, all reference to grams (g.) indicates dry weight.

Example 1

240 grams of a Raney copper catalyst (Kawaken Fine Chemical, CDT–60) developed according to the conventional method was placed in a 1 litre-reaction vessel (material: stainless steel SUS–27) provided with a stirrer and a device for separation of the catalyst, then acrylonitrile and water, from which about 90% of the dissolved oxygen had been removed by passing each through a device for removing oxygen beforehand, were continuously supplied thereto at rates of 140 g./hr. and 690 g./hr., respectively, and the reaction was continued for 21 days at a temperature of 120° C. In the meantime, the conversion of acrylonitrile to acrylamide was lowered from 78% on the day of commencement of the reaction to 57% 10 days after, and further lowered to 43% on the last (21st) day.

The catalyst was removed from the vessel at the completion of the reaction, and was regenerated by heating at 60° C. for 4 hours together with 1.5 kg. of a 30% aqueous solution of caustic soda in a flask provided with a stirrer. Next, the catalyst was washed fully with water, then it was placed again in the same reaction vessel, and the reaction was continued for 15 days under the same conditions as before except that the reaction temperature was raised to 130° C. In the meantime, the conversion from acrylonitrile to acrylamide was lowered from 75% on the day of resumption of reaction to 28%.

Next, to bring said conversion values into proper correlation with the below-described ratings of the effects of various reactivating agents, activity values were determined for said catalyst before the commencement of the reaction, which catalyst provided a conversion rate of 78%, and said catalyst after use, which catalyst provided conversion rate of 43%, by the below-described method. The results are shown in Table 1(A).

TABLE 1(A)

| | Activity value (percent) |
|---|---|
| Catalyst before use | 63 |
| Catalyst after use | 12 |

In the above Table 1(A), the activity values were determined as follows: 6.6 grams of acrylonitrile, 36 grams of water and 7 grams of the catalyst were placed in a 100 ml. flask provided with a stirrer, and then the reaction was continued for 2 hours at 72° C. The conversion (percent) of acrylonitrile to acrylamide at the close of the reaction was taken as the activity value of the catalyst.

Next, 100 grams each of aqueous solutions of various chemicals was placed in 200 ml. flasks each provided with a stirrer, respectively, then 7 grams of said used catalyst was added to each flask, the treatment for regeneration was conducted by heating each at 60° C. for 2 hours, and after washing each catalyst with water, its activity value was determined by the above-described method. The results are shown in Table 1(B).

TABLE 1(B)

| Experiment number: | Reactivating agent | Concentration of agent (percent by weight) | Activity value (percent) |
|---|---|---|---|
| 1 | NaOH | 30 | 34 |
| 2 | NaOH | 10 | 28 |
| 3 | NaOH | 1 | 32 |
| 4 | NaOH | 0.1 | 24 |
| 5¹ | NaOH | 1 | 47 |
| 6 | NH₄Cl | 36 | 50 |
| 7 | NH₄Cl | 10 | 40 |
| 8 | NH₄Cl | 1 | 23 |
| 9 | NaCl | 20 | 46 |
| 10 | NaCl | 10 | 39 |
| 11 | NH₃ | 13 | 18 |
| 12 | NH₃ | 1 | 22 |
| 13 | (NH₄)₂SO₄ | 10 | 23 |
| 14 | NaCN | 10 | 32 |
| 15 | KOH | 10 | 45 |
| 16 | Ca(OH)₂ | 10 | 39 |
| 17 | Na₂CO₃ | 10 | 29 |
| 18 | K₂CO₃ | 10 | 26 |
| 19 | KCl | 10 | 40 |
| 20 | CaCl₂ | 10 | 35 |
| 21 | KCN | 10 | 28 |
| 22 | (NH₄)₂C₂O₄ | 10 | 18 |
| 23 | HCl | 10 | 4 |
| 24 | H₂O | | 11 |

¹ In Experiment No. 5. the reactivation temperature was 100° C.

NOTE.—Experiments Nos. 1–22 are examples of the present invention; Experiments Nos. 23–24 are comparative examples.

Example 2

240 grams of Raney copper developed by the conventional method were placed in the same reaction vessel as used in Example 1, then methacrylonitrile and water from which about 90% of the dissolved oxygen had been removed beforehand by passing each through a device for removing oxygen were fed continuously to the reaction vessel at rates of 250 g./hr. and 1100 g./hr., respectively, and the reaction was continued for 7 days at a temperature of 120° C. In the meantime, the conversion of methacrylonitrile to methacrylamide lowered from 61% on the day of commencement of the reaction to 40% on the last day.

7 grams of the catalyst was removed from the reaction vessel at the close of the reaction, and then it was regenerated with a 30% aqueous solution of caustic soda under the same conditions as in Example 1, and it was washed fully with water. Its activity values determined are shown in Table 2.

TABLE 2

| | Activity value* (Percent) |
|---|---|
| Catalyst before use | 66 |
| Catalyst after use | 46 |
| Catalyst after regeneration | 66 |

*The activity was determined as follows: 8.35 grams of methacrylonitrile, 36 grams of water and 7 grams of the catalyst were placed in a 100 ml. flask provided with a stirrer, and the reaction was carried out at 72° C. for 2 hours. The conversion of methacrylonitrile to methacrylamide was taken as the activity value of the catalyst.

EXAMPLE 3

60 grams of Raney copper developed according to the conventional method was placed in a 400 ml. glass reaction vessel provided with a stirrer and a device for separating the catalyst, then acrylonitrile and water were continuously fed to the vessel at rates of 30 g./hr. and 380 g./hr., respectively, and the reaction was contained for 28 days while maintaining the temperature of the reaction mixture at 80–90° C. at which temperature the reaction mixture began to boil. In the meantime, the conversion of acrylonitrile to acrylamide lowered from 67% on the day of commencement of the reaction to 37% on the last day. Nitrogen gas had been blown into the storage tanks for acrylonitrile and water beforehand to remove a part of the dissolved oxygen therefrom.

At the close of the reaction, the catalyst was removed from the vessel, and 7 grams thereof was regenerated by heating it together with a 30% aqueous solution of caustic soda at 60° C. for 2.5 hours in a 200 ml. flask provided with a stirrer, and then it was washed with water. Its activity values determined by the same method as in Example 1 are as shown in Table 3.

TABLE 3

| | Activity value (Percent) |
|---|---|
| Catalyst before | 62 |
| Catalyst after 28 days of use | 35 |
| Catalyst after regeneration | 59 |

EXAMPLE 4

60 grams of a Raney copper catalyst developed by the conventional method was placed in a 1.6 litre reaction vessel (material: stainless steel, SUS–27) provided with a stirrer, then acrylonitrile and water from which a part of the dissolved oxygen had been removed beforehand by passing each through a device for removing oxygen were added in amounts of 330 grams and 860 grams respectively, and the reaction was carried out at 120° C. for 3 hours.

After the completion of the reaction, the reaction mixture was cooled, the catalyst was precipitated, the greater part of the supernatant liquid was drawn out, then acrylonitrile and water were supplied anew in the same manner as before, and the reaction was repeated under the same conditions as before. Care was taken lest air should enter the reaction system during these operations. The catalyst activity was lowered gradually as the reaction was repeated, and in turn the conversion of acrylonitrile to acrylamide was lowered, and so the time for reaction was prolonged lest the conversion should fall below 70%. The last or the 26th time for reaction was 6 hours, and the sum of the 26 periods of time for reaction was 1200 hours.

After completion of the reactions, the catalyst was regenerated with a 10% aqueous solution of ammonium chloride under the same conditions as in Experiment No. 7 of Example 1, and it was washed with water. Its activity values determined by the same method as in Example 1 are shown in Table 4.

TABLE 4

| | Activity value (Percent) |
|---|---|
| Catalyst before use | 78 |
| Catalyst after use | 30 |
| Catalyst after regeneration | 56 |

EXAMPLE 5

A reaction cylinder (material: stainless steel SUS–27) having an internal diameter of 30 mm. and a length of 300 mm. was charged with 390 grams (bulk volume: 220 ml.) of cupric oxide tablets (made by Nikki Kagaku Kabushiki Kaisha), and then the oxide was reduced at 200–270° C. by passing hydrogen gas and nitrogen gas through the cylinder at rates of 200 ml./min. and 400 ml./min., respectively.

This was used as a catalyst, and acrylonitrile and water from which about 90% of the dissolved oxygen had been removed beforehand by passing each through a device for removing oxygen were continuously fed to the reaction cylinder at rates of 140 g./hr. and 690 g./hr., respectively, and at the same time the reaction mixture was circulated at a rate of 40 l./hr. Thus, the reaction was continued for 20 days at 120° C. In the meantime, the conversion of acrylonitrile to acrylamide was lowered from 71% on the day of commencement of the reaction to 52% 10 days after, and was further lowered to 38% 20 days later.

At the close of the reaction, the reaction mixture was replaced by water, and then the catalyst was renegerated by feeding a 30% aqueous solution of caustic soda to the cylinder at a rate of 200 ml./hr. while keeping its temperature at 60° C. for 5 hours. After the caustic soda solution inside the cylinder was replaced by water, the reaction was resumed and continued for 20 days under the same conditions as before. In the meantime, the conversion of acrylonitrile to acrylamide was lowered from 65% on the day of resumption of the reaction to 39% 10 days after and was further lowered to 28% on the last day. After the end of the reaction, the catalyst was regenerated under the same conditions as before, and the reaction was resumed under the same conditions as before. The conversion of acrylonitrile to acrylamide was 65%. The changes in the conversion of acrylonitrile during the above course of reactions are shown in Table 5.

TABLE 5

| Point of time: | Conversion of acrylonitrile (Percent) |
|---|---|
| Day of commencement of reaction | 71 |
| 10 days after | 52 |
| 20 days after | 38 |
| Day of resumption of reaction after regeneration of catalyst | 65 |
| 10 days after | 39 |
| 20 days after | 28 |
| After 2d time regeneration of catalyst | 65 |

EXAMPLE 6

A reaction cylinder (material: stainless steel SUS–27) having an internal diameter of 30 mm. was charged with 670 grams (bulk volume: 520 cc.) of so-called copper-chromium catalyst tablets (N 201 made by Nikki Kagaku Kabushiki Kaisha), and then the catalyst was reduced by passing nitrogen gas containing 2% of hydrogen gas, which mixture had been pre-heated at 180° C., through the cylinder at a rate of 60 l./min. Next, acrylonitrile and water from which about 90% of the dissolved oxygen had been removed beforehand by passing each through a device for removal of oxygen were fed continuously to the reaction cylinder at rates of 270 g./hr. and 670 g./hr., respectively, and at the same time the reaction mixture was circulated at a rate of 40 l./hr. Thus, the reaction was continued for 5 days at a temperature of 120° C. In the meantime, the conversion of acrylonitrile to acrylamide was lowered from 71% on the day of commencement of the reaction to 58% on the day of termination of the reaction.

At the close of the reaction, the catalyst was regenerated and washed with water in the same manner as in Example 5, and then the reaction was resumed under the same conditions as before. The conversion of acrylonitrile after resumption was 70%, and it was clear that the catalyst was renegerated.

Further, substantially the same result was obtained when a copper-zinc catalyst (N 211 of Nikki Kagaku Kabushiki Kaisha) was used.

Example 7

10 grams of a Raney copper catalyst developed by the conventional method and 20 grams of water were placed in a 30 ml. reaction vessel made of SUS–27, then nitrogen gas was blown into the vessel to remove the dissolved oxygen and the oxygen gas present in the space inside the vessel, the vessel was closed tightly, and the contents were heated at 120° C. and 140° C. The relation between the heating time and the catalyst activity was determined by using the results of activity tests conducted under the same conditions as in Example 1. The results are shown in Table 7. Further, the catalyst heated at 120° C. for 166 hours was regenerated with a 10% aqueous solution of ammonium chloride under the same conditions as in Experiment No. 7 of Example 1. The result is shown in Experiment No. 8 of Table 7.

TABLE 7

| Experiment No. | | Heating | | Activity value (percent) |
|---|---|---|---|---|
| | | Temperature (°C.) | Time (hr.) | |
| 1 | Catalyst before use | | | 69 |
| 2 | Heat-treated catalyst | 120 | 4 | 63 |
| 3 | do | 120 | 36 | 56 |
| 4 | do | 120 | 166 | 52 |
| 5 | do | 140 | 4 | 64 |
| 6 | do | 140 | 36 | 49 |
| 7 | do | 140 | 216 | 32 |
| 8 | Catalyst obtained by regenerating Experiment No. 3 | | | 69 |

Example 8

12 grams of Raney copper developed by the conventional method was placed in a 1 litre glass reaction vessel provided with a stirred and a device for separating the catalyst, and then the catalyst was treated with water, which had been saturated with air at room temperaure, by supplying it to the vessel at a rate of 4 l./hr. for 5 hours. The reaction vessel was maintained at room temperature during this period. Next, 7 grams of the catalyst thus treated was regenerated with a 10% aqueous solution of ammonium chloride under the same conditions as in Experiment No. 7 of Example 1. Its activity values determined by the same method as in Example 1 are shown in Table 8.

TABLE 8

Activity value (percent)
Catalyst before use _____ 59
Catalyst treated with water _____ 35
Catalyst after regeneration _____ 57

When the activity values were measured, formation of ethylene cyanohydrin as by-product was recognized from the catalyst treated with water, but no ethylene cyanohydrin was formed by the catalyst after regeneration.

Example 9

The procedure of Example 8 was followed, except that Ullmann copper prepared by adjusting an aqueous solution of copper nitrate with metallic zinc was used as catalyst, and then activity values of the catalyst were determined by the same method as in Example 1. The results are shown in Table 8.

TABLE 8

Activity value (percent)
Catalyst before use _____ 25.5
Catalyst treated with water _____ 15.2
Catalyst after regeneration _____ 23.5

Example 10

Experiments were conducted using as catalyst copper powder and copper metal net, and the results shown in the following table were obtained.

In the experiment using copper powder, the reaction was carried out under the same conditions as in Example 1; and in the experiment using copper metal net, the reaction was carried out under the same conditions as in Example 5. In each case, the catalyst activity was shown by the conversion at the time of continuous operation.

| Catalyst | Reaction temperature (°C.) | Time for reaction (day) | Catalyst activity | | |
|---|---|---|---|---|---|
| | | | Before use | After use | After regeneration |
| Copper powder | 120 | 5 | 12 | 5 | 10 |
| Copper metal net | 120 | 5 | 6 | 3 | 5 |

What is claimed is:

1. A process for the regeneration of metallic copper catalysts used in producing corresponding amide compounds from nitrile compounds by hydrating the nitrile radical of the nitrile compounds, which process comprises steeping the catalyst in an aqueous solution containing at least 0.1 weight percent of a compound selected from the group consisting of sodium hydroxide, potassium hydroxide, calcium hydroxide, sodium chloride, potassium chloride, calcium chloride, sodium carbonate, potassium carbonate, sodium cyanide, potassium cyanide, ammonia, ammonium hydrochloride, ammonium sulfate, ammonium oxalate and mixtures thereof maintained at a temperature of 0–200° C., and water washing said compound from the regenerated catalysts.

2. The process according to claim 1 wherein the nitrile compound is acrylonitrile or methacrylonitrile, and the corresponding amide is acrylamide or methacrylamide.

3. The process according to claim 1 wherein the metallic copper catalyst consists of at least one component selected from the group consisting of Raney copper, Ullmann copper, reduced copper-chromium catalyst, reduced copper-zinc catalyst, and metallic copper pieces in the form of powder, wire or net.

4. The process according to claim 1 wherein the temperature of said aqueous solution of said compound is maintained at a temperature of 20–150° C. at the time of said steeping treatment.

5. The process according to claim 1 wherein the concentration of said compound in said solution is 1–40% by weight.

References Cited
UNITED STATES PATENTS

| 3,381,034 | 4/1968 | Greene et al. | 260—561 N |
| 3,597,481 | 8/1971 | Tefertiller et al. | 260—561 R |
| 3,631,104 | 12/1971 | Habermann et al. | 260—561 N |
| 3,642,894 | 2/1972 | Habermann et al. | 260—561 N |
| 3,686,307 | 8/1972 | Greene et al. | 260—561 N |

DANIEL E. WYMAN, Examiner

P. E. KONOPKA, Assistant Examiner

U.S. Cl. X.R.

260—558 R, 561 R, 561 N, 561 R; 252—413